United States Patent [19]

Cooper et al.

[11] Patent Number: 5,376,057
[45] Date of Patent: Dec. 27, 1994

[54] MULTISTAGE DIFFERENTIAL GEAR PACKAGE

[75] Inventors: Timothy R. Cooper, Owego, N.Y.; Scott A. Delozier, Milan, Pa.

[73] Assignee: Ingersoll-Rand Company, Woodcliff Lake, N.J.

[21] Appl. No.: 87,222

[22] Filed: Jul. 8, 1993

[51] Int. Cl.⁵ .............................. F16H 1/04
[52] U.S. Cl. ...................... 475/248; 74/413; 74/414; 74/421 R; 475/339; 475/340
[58] Field of Search ............ 74/412 R, 413, 414, 74/421 R, 462; 475/248, 331, 338, 339, 340, 344

[56] References Cited

U.S. PATENT DOCUMENTS

| | | | |
|---|---|---|---|
| 1,609,075 | 9/1925 | Evans | 475/339 |
| 1,632,571 | 6/1927 | Watson | 475/339 |
| 3,686,978 | 8/1972 | Knoblach et al. | 475/340 X |
| 4,280,376 | 7/1981 | Rosen | 475/344 |

FOREIGN PATENT DOCUMENTS 0129157  6/1991  Japan ...................... 74/462

Primary Examiner—Charles A. Marmor
Assistant Examiner—Peter Kwon
Attorney, Agent, or Firm—Walter C. Vliet

[57] ABSTRACT

A gear set is provided having a plurality of two-stage intermediate gears which do not require indexing on assembly or reassembly of the gear train. This is provided by aligning the two-stage gear teeth in axial alignment tooth for tooth between the stage while maintaining an appropriate number of teeth on the input and output gears.

8 Claims, 4 Drawing Sheets

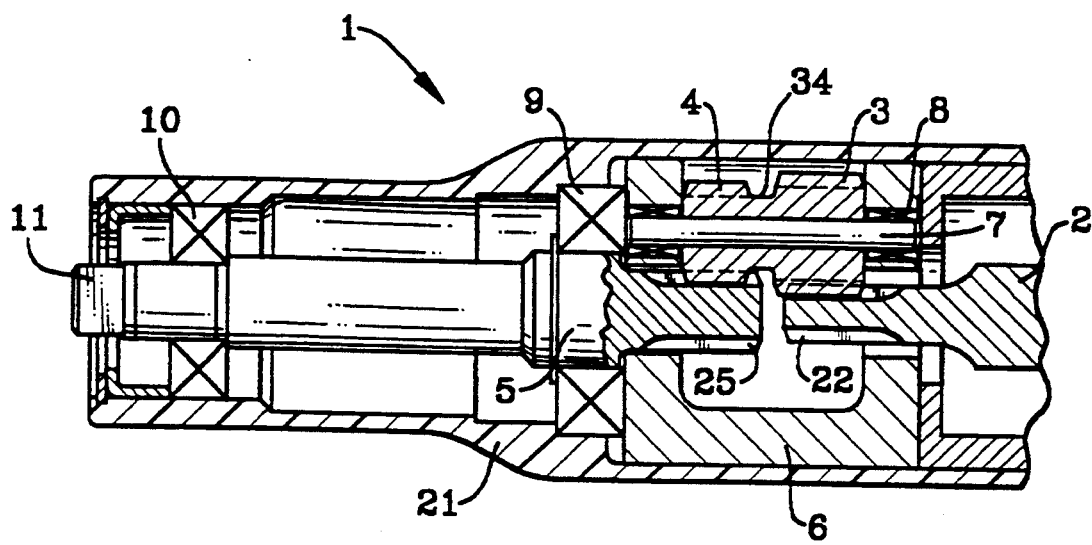
FIG. 1
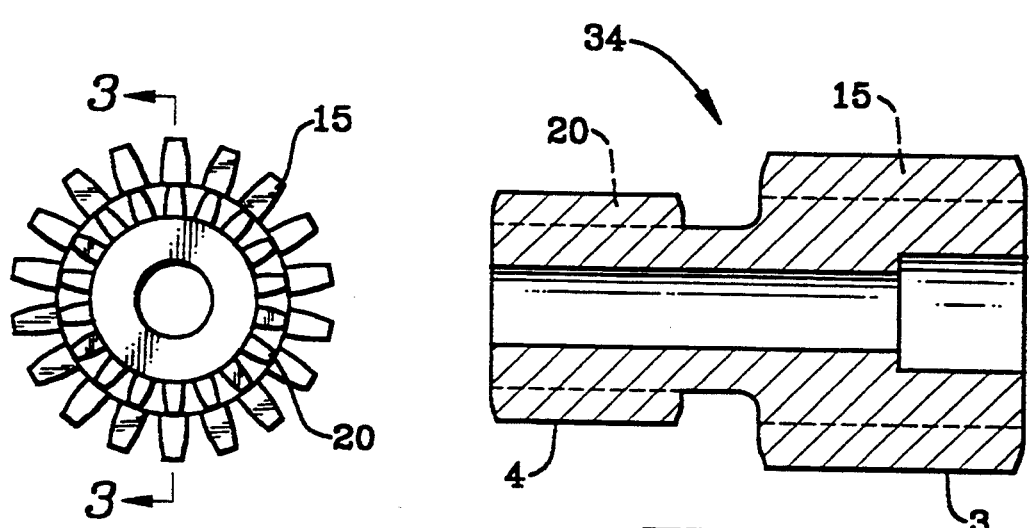
FIG. 2
FIG. 3

MULTISTAGE DIFFERENTIAL GEAR PACKAGE

BACKGROUND OF THE INVENTION

This invention relates generally to reduction gear packages and more particularly to a universally aligned multistage differential gear package for use with power tools and the like wherein assembly may be accomplished without regard for specific gear alignment or indexing during assembly. Typically, multistage differential gear units using a plurality of intermediate two stage gears have required specific indexing on assembly to assure proper gear timing to prevent lockup and to permit the rotation of the gear package in operation.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully discussed hereinafter.

SUMMARY OF THE INVENTION

In one aspect of the present invention this is accomplished by providing a universally aligned multistage differential gear package including a gear frame operatively connected to a set of two-stage gears; an input gear for driving the set of two-stage gears; an output gear being driven by the set of two-stage gears; and wherein the number of teeth on the input gear and the output gear are integer multiples of the number of said two-stage gears, and wherein the number of teeth on the first stage of the two-stage gears is equal to the number of teeth on the second stage of the two-stage gears, and all teeth on the second stage of the two-stage gears are fabricated in axial alignment with the teeth on the first stage of the two-stage gears.

The foregoing and other aspects will become apparent from the following detailed description of the invention when considered in conjunction with the accompanying drawing figures.

BRIEF DESCRIPTION OF THE DRAWINGS

FIG. 1 is a cross section of a gear reduction set for a power tool according to the present invention;

FIG. 2 is an end view of a two-stage gear according to the present invention having a one to one ratio of the number of teeth in the first stage to the number of teeth in the second stage;

FIG. 3 is a cross sectional view of the two-stage gear shown in FIG. 2 taken at Section 3—3 of FIG. 2;

DETAILED DESCRIPTION

Figure 4:
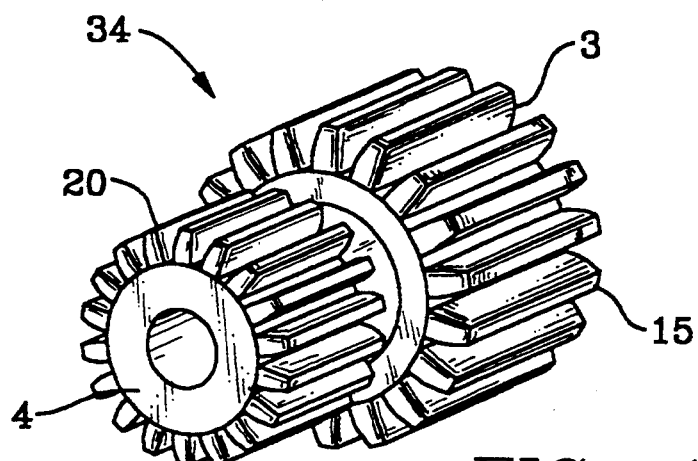
FIG. 4 is an isometric view of a two-stage gear according to the present invention.

Referring to FIG. 1, a power tool having a differential gear reducer according to the present invention is generally shown by reference numeral 1. The gear reducer is generally shown enclosed in a casing 21 which may be conveniently attached to a motor housing (not shown) containing a motor (also not shown) having its output on a spindle 2. The spindle 2 is further provided with an input pinion gear 22 which drives two or more circumferentially spaced two-stage gears 34 through a first stage pinion 3 which in turn is attached to a second stage pinion 4. The second stage pinion 4 in turn drives an output spindle 5. The output spindle 5 is mounted for rotation within the housing 1 by means of a pair of ball bearings 9, 10. The spindle further has its output on, for example, a square drive 11, which, for example, may be utilized to mount a socket which in turn may engage a fastener or the like (not shown).

Referring again to FIG. 3, the first stage gear 3 of each of the two-stage gears 34 is provided with gear teeth 15 which engage the teeth 22 of the pinion 2. The second stage gear 4 of each of the two-stage gears 34 is provided with gear teeth 20 which in turn engage the gear teeth 25 of the output spindle 5.

As shown in FIG. 1, the two-stage gears are mounted in a gear frame 6. According to the present invention, two or more sets of two-stage gears are provided. For purposes of the preferred embodiment herein described we have chosen to include 3 two stage gears 34 which are mounted in the gear frame 6 by means of gear pins 7 which are pressed into bearings 8 provided in the gear frame 6. Where 3 two-stage gear sets are provided, they are spaced approximately 120 degrees apart to balance and distribute the load and to share the drive forces conducted through the gear set.

The multiple two-stage gears substantially increase the amount of power that may be transmitted by a given gear set. However, in the case of the prior art, it was necessary to carefully align the two-stage gear sets to an indexed starting point. This was time-consuming in assembly and servicing of the gear sets and in the event this was not accomplished damage to the gear set could occur.

According to the present invention, a multistage differential gear set may be provided which is free of the index requirement. This is accomplished as follows:

The number of teeth on the pinion and output shafts are integer multiples of the number of two-stage gears, i.e., $$T_p I_1 * N$$

and $$T_{os} = I_2 * N$$

wherein:
$T_p$=Number of teeth on the pinion
$T_{os}$=Number of teeth on the output shaft
N=Number of two-staged gears
$I_1$ and $I_2$=Integers=1, 2, 3, etc.
In this case, $I_1$ can=$I_2$ but does not have to.
The number of two-staged gears determines their spacing about the gear package centerline, i.e., $$J = 360° / N$$

wherein

J = Spacing of two-staged gears in degrees.

According to the present invention, the number of teeth on the first stage must be equal to the number of teeth on the second stage of the two stage gear 34. Variation of the diametral pitch at either end of the two-stage gear is acceptable.

Referring to FIG. 2, according to the present invention all the teeth on the second stage gears must be fabricated such that they are in axial alignment (tooth on tooth) with teeth on the first stage. By fabricating the two-staged gears such that their teeth are in axial alignment, it is insured that proper gear mesh will occur at both ends of the two-stage gear at every J spacing.

Figure 5:
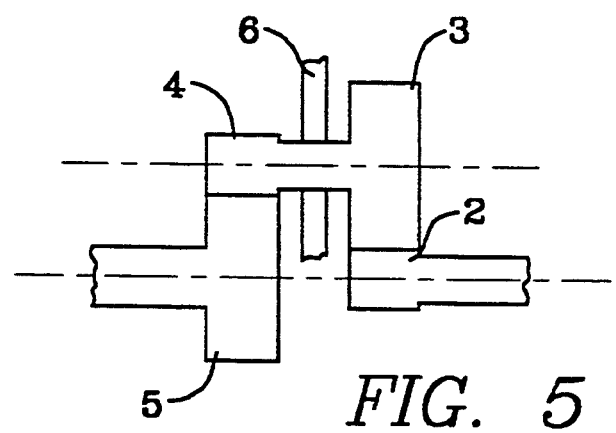
FIG. 5 is a schematic view of one embodiment of the present invention utilizing spur gears for all gearing.

FIG. 5 shows a schematic gear reduction set wherein all of the reduction gears are spur gears. The reference numerals referred to previously described elements as shown and described in FIGS. 1-6.

Figure 6:
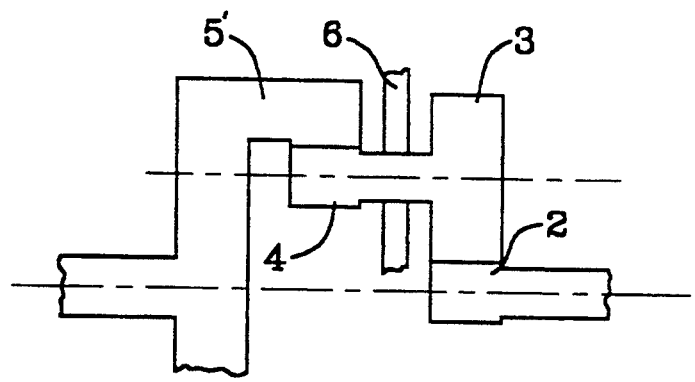
FIG. 6 is a schematic view of one embodiment of the present invention utilizing spur gears for the input gear and two stage gears and a ring gear for the output gear.

FIG. 6 shows a variation of the preferred embodiment wherein the output gear is in the form of a ring gear or internal gear.

Figure 7:
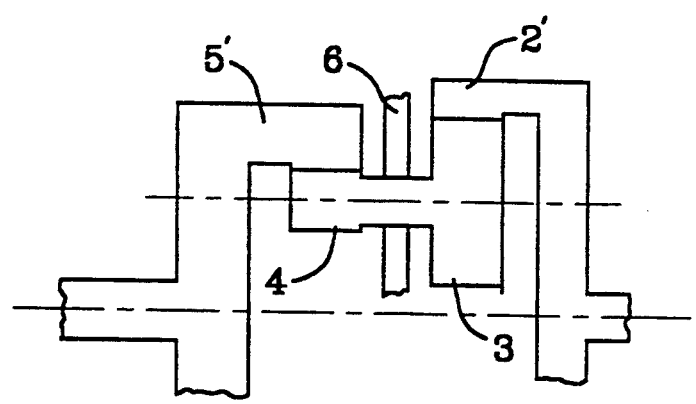
FIG. 7 is a schematic view of one embodiment of the present invention utilizing ring gears for the input and output gears and spur gears for the two-stage gear.
Figure 8:
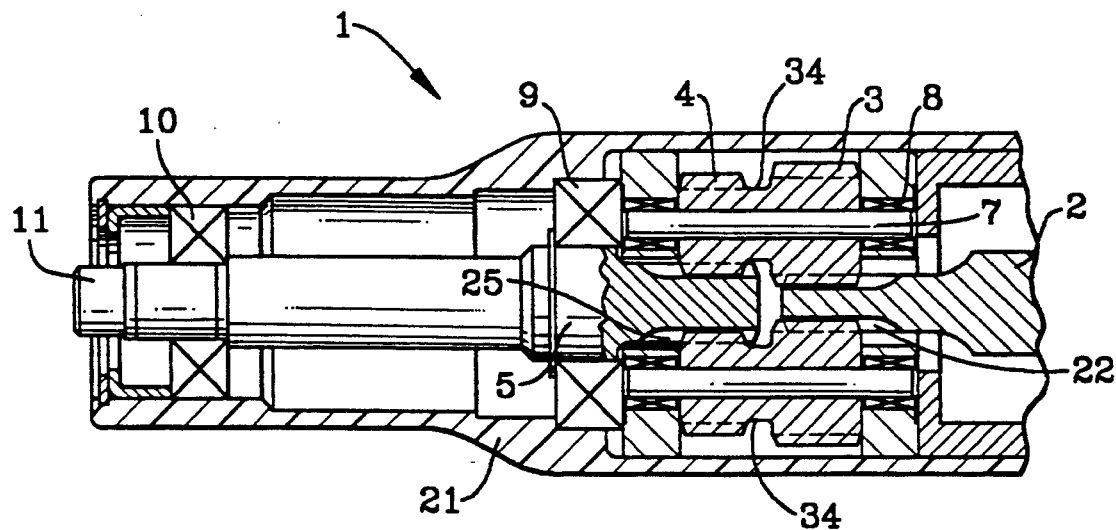
FIG. 8 is a cross section view of a gear reduction set for a pair of two stage gears.
Figure 9:
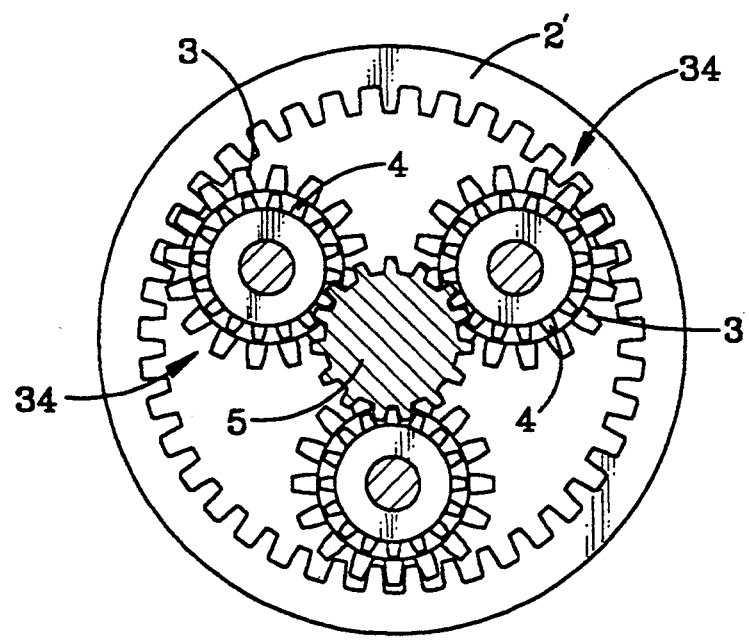
FIG. 9 is a front end view of a gear reduction set for a plurality of two stage gears.

In FIG. 7 another embodiment is shown wherein both the input gear 2' and the output gear 5' are internal gears or ring gears.

Having described a number of alternative embodiments, other variations may occur to one skilled in the art.

What is claimed is:

1. A universally aligned multistage differential gear package comprising:
   a gear frame operatively connected to a set of two stage gears;
   an input gear for driving said set of two stage gears;
   an output gear being driven by said set of two stage gears; and
   wherein the number of teeth on said input gear and said output gear are integer multiples of the number of said two stage gears, and wherein the number of teeth on the first stage of said two stage gears is equal to the number of teeth on the second stage of said two stage gear, and all teeth on said second stage of said two stage gear are fabricated in axial alignment with said teeth on said first stage of said two stage gears.

2. A universally aligned multistage gear package according to claim 1, wherein all of the intermeshing gears are spur gears.

3. A universally aligned multistage differential gear package according to claim 1, wherein the input gear is in the form of an internal ring gear.

4. A multistage differential gear package according to claim 1, wherein said output gear is in the form of a ring gear.

5. A multistage differential gear package according to claim 1, wherein both said input gear and said output gear are in the form of a ring gear and said two stage gears are in the form of spur gears.

6. A multistage differential gear package according to claim 1, wherein a pair of two stage gears are provided.

7. A multistage differential gear package according to claim 1, wherein a plurality of two stage gears are provided.

8. A multistage differential gear package according to claim 1, wherein said two stage gears are mounted for rotation in said fixed gear frame.

* * * * *